E. WEINTRAUB.
VAPOR ELECTRIC APPARATUS.
APPLICATION FILED JUNE 30, 1905. RENEWED FEB. 5, 1915.

1,134,785.

Patented Apr. 6, 1915.

WITNESSES:
George A. Thornton
Helen Orford

INVENTOR:
zechiel Weintraub
By Albert G. Davis
Att'y

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

VAPOR ELECTRIC APPARATUS.

1,134,785. Specification of Letters Patent. Patented Apr. 6, 1915.

Original application filed March 23, 1903, Serial No. 149,084. Divided and this application filed June 30, 1905, Serial No. 267,720. Renewed February 5, 1915. Serial No. 6,371.

*To all whom it may concern:*

Be it known that I, EZECHIEL WEINTRAUB, a subject of the Czar of Russia, residing at Schenectady, county of Schenectady, State of New York, have invented certain new and useful Improvements in Vapor Electric Apparatus, of which the following is a specification.

This application is a division of my application, Serial No. 149,084 filed March 23, 1903, entitled "Rectifying alternating current."

The invention in the present case relates to certain arrangements involved in controlling the flow of current of vapor electric devices using alternating current. Devices of this character are ordinarily provided with a plurality of anodes or positive electrodes connected to the respective mains of the current supply system, and a cathode or negative electrode coöperating with the anodes. In order to prevent or to oppose an excessive flow of current between the two supply mains of the system, I include in series therewith a resistance or an inductance. I prefer, however, to use inductance inasmuch as less energy is thereby consumed in heat, while at the same time any abnormal flow of current is effectually opposed and normal or stable operation of the system thereby secured.

The novel features which characterize my invention I have pointed out with particularity in the appended claims. For a better understanding of my invention reference may be had to the accompanying description taken in connection with the accompanying drawings, in which—

Figure 1:
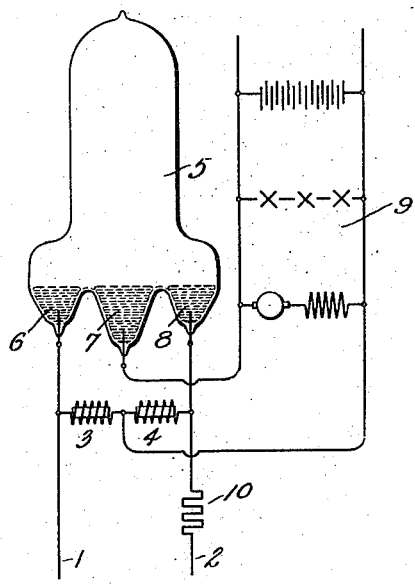
Figure 2:
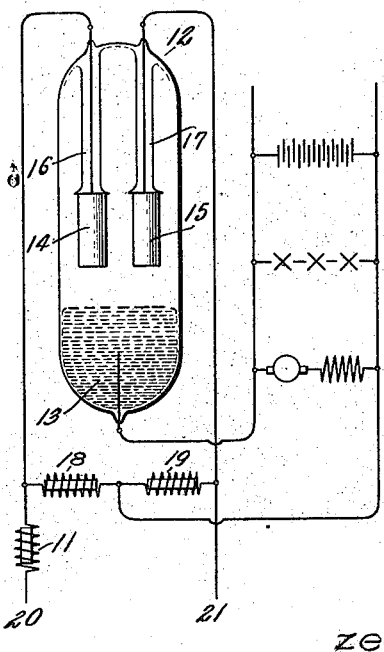

Figure 1 represents a rectifier system embodying my invention; and Fig. 2, a modified arrangement.

In Fig. 1 the supply mains for the rectifier are shown at 1 and 2 and across these mains are connected the inductance coils 3 and 4. The exhausted receptacle 5 of the rectifier proper is provided at its lower portion with the three mercury electrodes 6, 7, and 8. The consumption circuit, indicated generally at 9, has one lead connected to the middle electrode 7 and the other to the junction between the two inductance coils 3 and 4. To start the apparatus the receptacle is tilted or shaken so as to produce momentary contact between the middle electrode or cathode 7 and one or more of the anodes 6 and 8. The resulting arc, when of the proper direction, causes the apparatus to start. The inductances 3 and 4 cause the arcs from the cathode to overlap and thus render the apparatus self-operating. The upper portion of the chamber or receptacle 5 is utilized as a condensing chamber for cooling the mercury vapor.

To assist in securing stability of operation, I connect in circuit with the mains leading to the rectifier a resistance such as indicated at 10. Inasmuch, however, as a non-inductive resistance consumes energy, I may replace it by an inductive resistance, thus attaining stability without undue expenditure of energy. Such an inductive resistance I have indicated at 11 in Fig. 2.

Fig. 2 which I have used to illustrate the application of an inductive steadying means, represents a rectifier which is substantially the same in principle as that shown in Fig. 1 except that the electrodes 6 and 8, inasmuch as they operate as positive electrodes or anodes and are therefore not required to be vaporized to sustain the flow of current, are replaced by electrodes of non-vaporizable material. The receptacle in this case assumes a substantially cylindrical aspect as shown at 12. In the lower portion of the receptacle is a relatively large body of mercury 13 which operates as the common cathode. The two corresponding anodes 14 and 15 of iron, graphite or the like, are supported from the top of the receptacle as indicated, and the supporting conductors are surrounded by protecting tubes 16 and 17 of insulating material. The inductance coils or energy-storing devices are indicated at 18 and 19 and are connected in series with each other across the supply mains 20 and 21. The anodes 14 and 15 are connected to the respective supply mains, and the cathode 13 to the junction between the inductance coils as shown. Suitable leading-in wires are employed for the purpose of conveying current through the walls of the envelop or receptacle.

To start the rectifier, the level of the mercury 13 is raised so as to touch, and then separate from, the anodes 14 and 15, thus starting the arcs, an operation which has already been described. The contact between the mercury and the upper electrodes may be effected by shaking the receptacle or by some electrical or otherwise actuated mechanism for raising or lowering the level of the mercury, the precise details of the arrangements used being susceptible of considerable variation.

What I claim as new and desire to secure by Letters Patent of the United States, is,—

1. The combination of an exhausted receptacle, a plurality of positive electrodes therein, a negative electrode of vaporizable material therein, connections between the electrodes and a source of alternating current, and means for preventing arcing between the positive electrodes.

2. The combination of an exhausted receptacle, a plurality of positive electrodes therein, a negative electrode of vaporizable material therein, connections between the electrodes and a source of alternating current, and an impedance in the lead of one of the positive electrodes.

3. The combination of an exhausted receptacle, a plurality of positive electrodes therein, a negative electrode of vaporizable material therein, connections between the electrodes and a source of alternating current, and a device possessing ohmic resistance in the lead of one of the positive electrodes.

4. The combination of an exhausted receptacle, a plurality of positive electrodes therein, a negative electrode of vaporizable material therein, connections between the electrodes and a source of alternating current, one of the positive electrodes being connected directly to the source, and an impedance in the lead to every other positive electrode.

5. The combination of an exhausted receptacle, a plurality of positive electrodes therein, a negative electrode of vaporizable material therein, connections between the electrodes and a source of alternating current, and means external to the receptacle for preventing arcing between the positive electrodes.

In witness whereof, I have hereunto set my hand this 29th day of June, 1905.

EZECHIEL WEINTRAUB.

Witnesses:
BENJAMIN B. HULL,
HELEN ORFORD.